W. B., C. & C. P. KEIGHLEY.
BAND SAW KNIFE FOR TRIMMING SHOES.
APPLICATION FILED MAR. 30, 1908.
928,133. Patented July 13, 1909.
3 SHEETS—SHEET 2.
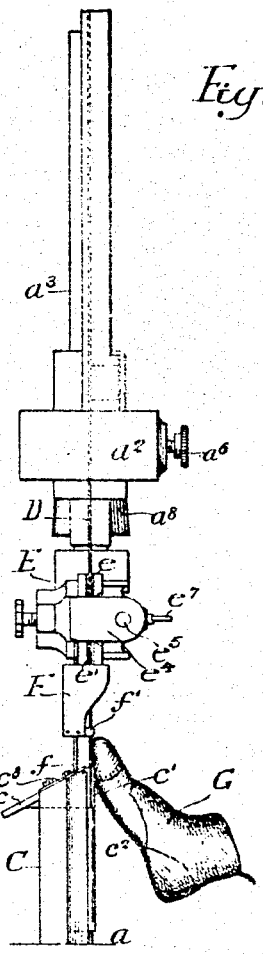
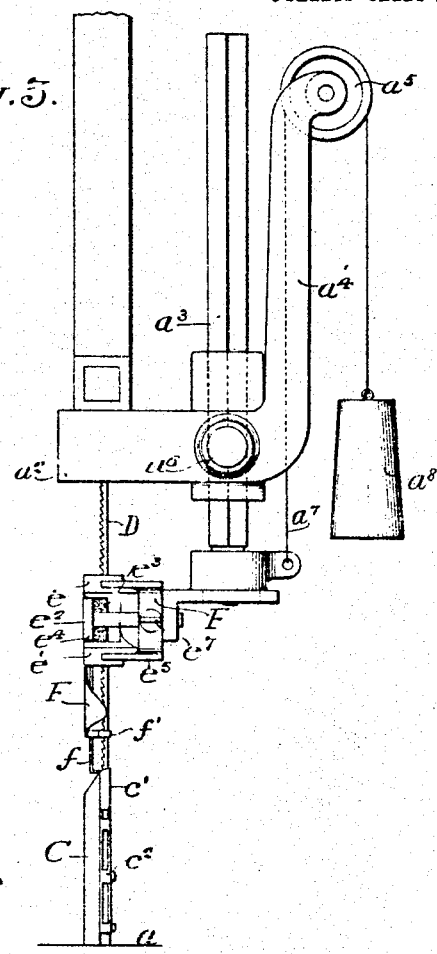
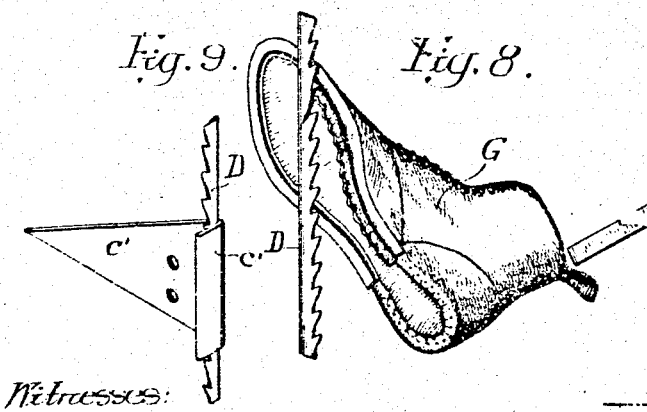
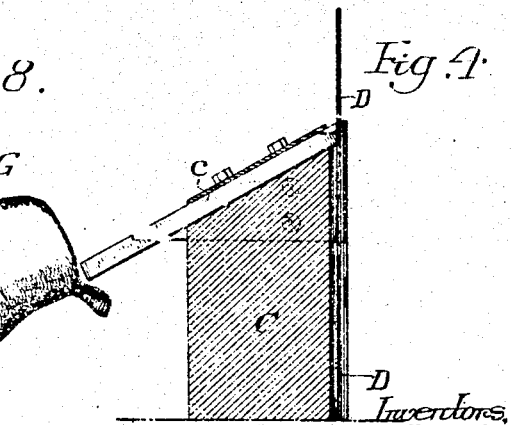

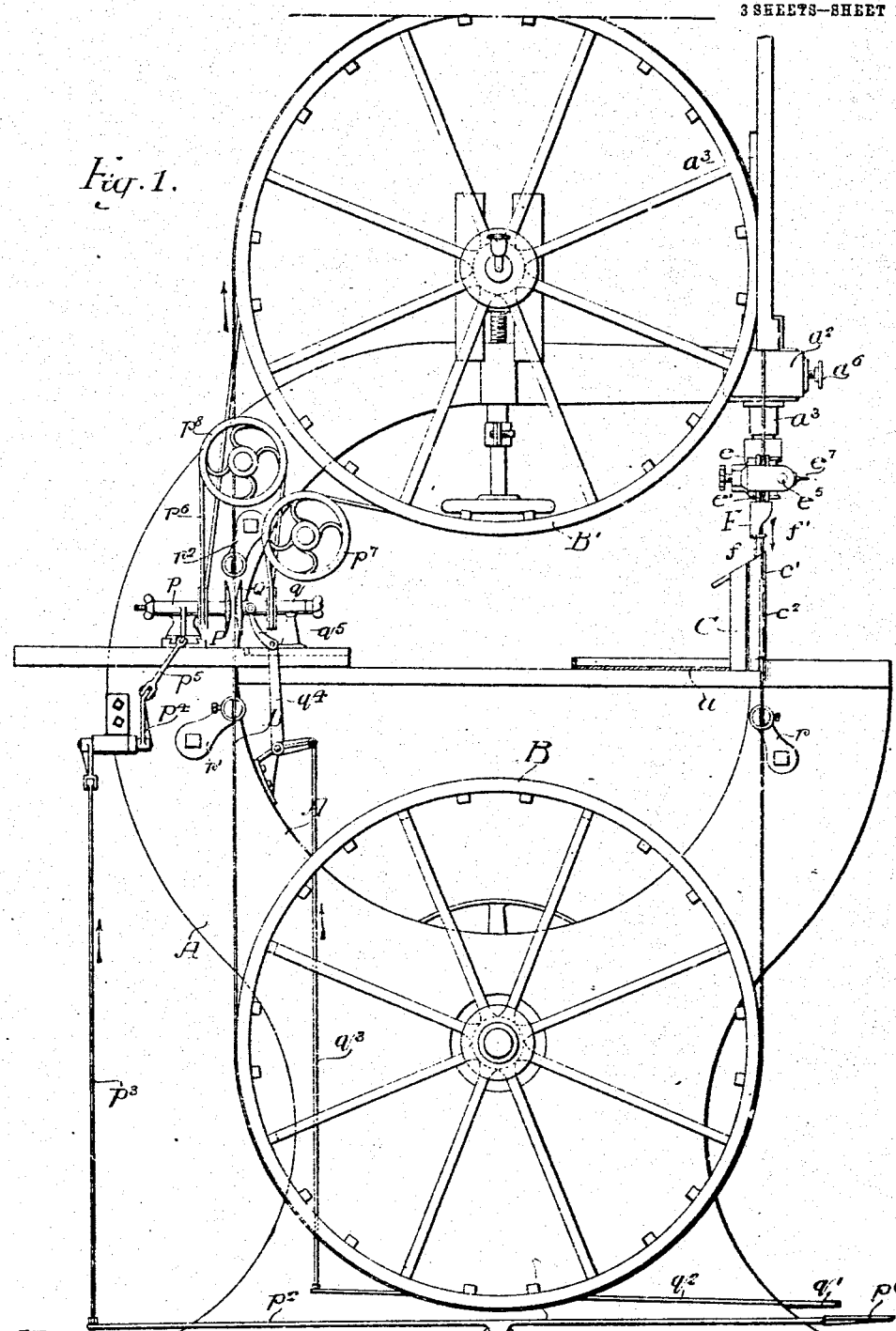

W. B., C. & C. P. KEIGHLEY.
BAND SAW KNIFE FOR TRIMMING SHOES.
APPLICATION FILED MAR. 30, 1908.
928,133.
Patented July 13, 1909.
3 SHEETS—SHEET 3.
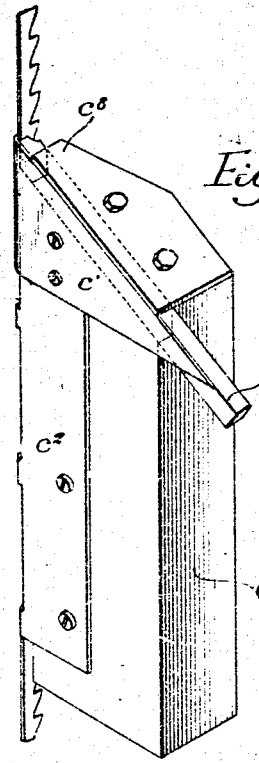
Fig. 5.
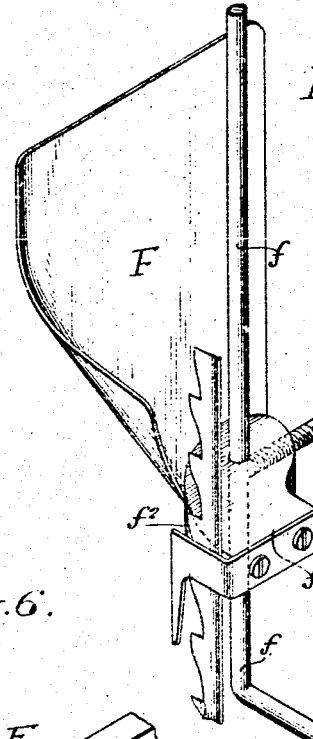
Fig. 7.
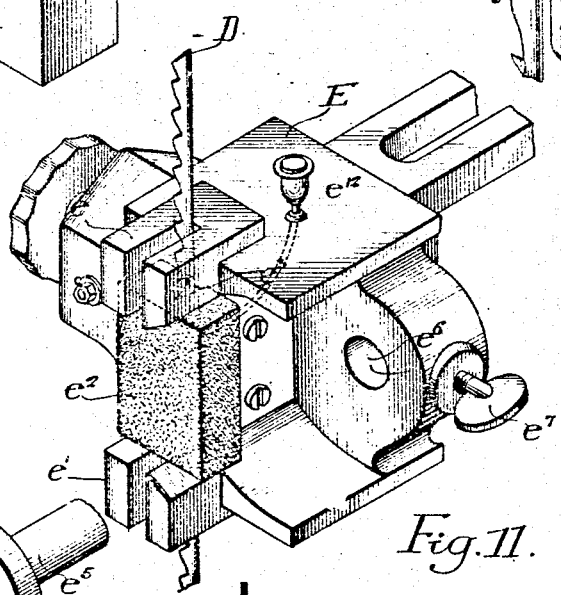
Fig. 6.
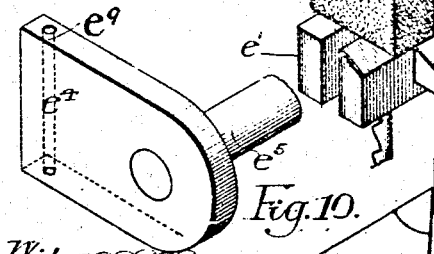
Fig. 10.
Fig. 11.
Witnesses:
Inventors,
William B. Keighley
Charles Keighley
Charles Percy Keighley
by their Attorneys Howson & Howson

UNITED STATES PATENT OFFICE.

WILLIAM B. KEIGHLEY, CHARLES KEIGHLEY, AND CHARLES PERCY KEIGHLEY, OF VINELAND, NEW JERSEY.

BAND-SAW KNIFE FOR TRIMMING SHOES.

No. 928,133.

Specification of Letters Patent.

Patented July 13, 1909.

Application filed March 30, 1908. Serial No. 424,184.

*To all whom it may concern:*

Be it known that we, WILLIAM B. KEIGHLEY, CHARLES KEIGHLEY, and CHARLES P. KEIGHLEY, citizens of the United States, residing in Vineland, New Jersey, have invented certain Improvements in Band-Saw Knives for Trimming Shoes, of which the following is a specification.

One object of our invention is to provide a band saw or knife with guards and auxiliary attachments whereby it is adapted for trimming the surplus leather and stock from the inseams of shoes during their manufacture.

It is further desired to provide a band saw or knife with improved guarding structures whereby the danger of injury to the operator is reduced to a minimum; it being also desired that the arrangement shall be such as to prevent injury to the shoe during the trimming operation.

In addition we desire to arrange the guards and the devices for supporting a shoe while it is being trimmed, so that this operation may be performed much more rapidly than has hitherto been possible.

These objects and other advantageous ends we secure as hereinafter set forth, reference being had to the accompanying drawings, in which:—

Figure 1, is a side elevation of a band saw or knife constructed according to our invention; Figs. 2 and 3, are enlarged elevations of portions of the machine shown in Fig. 1; Fig. 4, is a vertical section of the shoe-supporting post with its guard; Fig. 5, is a perspective view of the supporting post and its associated parts; Fig. 6, is a detached perspective view of the saw lubricating device; Fig. 7, is a perspective view of the finger guard; Fig. 8, is a perspective view illustrating the work performed by the knife or saw in removing surplus leather and stock from partially finished shoes; Fig. 9, is a perspective view illustrating one of the saw guards mounted on the supporting post, and Figs. 10 and 11, are respectively an enlarged side elevation and a plan, illustrating the preferred construction of the work supporting bar $c$.

While in the specification and claims we shall refer to the cutting device as a saw, it is to be understood that in some instances a toothless band knife may be employed without in any way departing from our invention.

Referring to Fig. 1 of the above drawings, A represents a main frame upon which are mounted two pulleys B and B′ having a band saw D mounted upon and extending between them in the well known manner. One of these pulleys, as B, is driven from any desired source of power and the other is so arranged as to be adjustable at will toward and from said first pulley.

Supported on the frame A is a table $a$ and to this is rigidly fixed a supporting post C of a somewhat elongated form and having its top face beveled or inclined rearwardly from the saw, the front run or length of which extends in close proximity to the front edge of said post.

As shown in Figs. 2 and 3, there is suspended from the upper member of the main frame a structure $a^2$ having adjustably mounted upon it a vertically movable bar $a^3$, and provided with an extension or bracket $a^4$ carrying a pulley $a^5$. Said bar $a^3$ may be fixed in any desired position by means of a headed screw $a^6$, and carries at its lower end a block E, there being attached to these parts a flexible cord or wire $a^7$ extending up and around the pulley $a^5$ and having hung to its end a weight $a^8$.

The block E is provided with upper and lower overhung slotted guides $e$ and $e'$ provided with passages for the saw D. In the space between these two guides is placed a body of felt or other absorbent material $e^2$, saturated with oil, grease or other lubricating material supplied from a sight feed or other cup $e^{12}$. This piece $e^2$ is notched or slotted as illustrated at $e^3$ for the reception of the saw, and is held in place by a clamping piece $e^4$ mounted on a rod $e^5$ passing through an opening $e^6$ in the block E and adjustably held in place by means of a thumb screw $e^7$.

The supporting post C has one of its top corners cut away or recessed for the reception of a bar $c$, whose upper or front end is beveled so that its face is substantially parallel with the saw and immediately adjacent thereto; being adjustable toward and from the saw to allow for wear. This bar $c$ is kept in place partly by a guard piece $c'$, held by screws to one side of the upper end of the supporting post C and extending behind the saw, as well as around in front of it, with its top edge at about the level of the upper end of the bar c which projects slightly beyond the face of said post. It is also partly held in position by a clamping plate c⁴ which, like the post C, is cut away or tapered at its front end. Both the bar c and the guard c⁵ preferably press against the saw, with the result that it is held from yielding and thereby caused to make a clean cut.

From Figs. 5 and 9 it will be seen that this guard piece c⁵ is of sheet material and effectually protects the length of the saw immediately below the bar c, there being below it a second guard c², in the present instance held to the side of the post C by screws and also extending around the front and back of the saw. This latter is therefore practically completely covered from the top edge of the bar c downwardly to the surface of the table a, and in order to further protect its upper length between the supporting post and the under side of the block E, we provide another guard F which consists of a piece of sheet material extending across the front of the upper part of the saw and bent around so as to cover one side of this post, as shown best in Fig. 7. Said guard is supported in position by means of a small rod or wire f extending from a block f' fastened to its lower edge and of such a length as to rest upon the top face of the post C at the rear of the saw, while its upper end is guided by and slides in a suitable recess or passage c⁹ in the clamping piece c⁴. Said block is slotted at f² for the passage of the saw, so that it will be understood that the guard F, while very completely covering the upper part of the exposed length of saw immediately below the lubricating block E, is yet free to move and also does not interfere with a proper operation of said saw.

As illustrated in Figs. 10 and 11, the bar c is so shaped that the front portion of its upper edge approaches very closely to the saw, while it recedes from it both below and to the rear.

For maintaining the knife or saw in a suitably sharpened condition, we provide a pair of emery or other grinding wheels P and Q, Fig. 1, mounted on a shaft carried in suitable bearing structures p and q. The first of these is so mounted upon the frame A of the machine as to be bodily movable in a line substantially parallel to the plane of the adjacent portion of the saw or knife and for the purpose of moving it we provide a treadle p' connected to it through a treadle lever p², a link p³, lever p⁴, and a second link p⁵; the arrangement being such that when the treadle is depressed, the bearing structure, and with it the emery wheel, is moved so that the latter is brought into engagement with one side of the saw or knife blade. This particular wheel is designed to grind the blade practically flat, while the wheel Q is so mounted as to grind said blade on a decided bevel. For the purpose of moving this second wheel into and out of engagement with the knife, we provide a second treadle q' connected through a lever q², link q³, lever q⁴, and a second link q⁵ to the bearing structure q.

For driving the two grinding wheels while leaving them free to be moved, we provide a pulley wheel on each of the two wheel shafts and actuate these from the upper saw driving pulley B' through a single driving belt p⁶, guiding this belt by a pair of idler pulleys p⁷ and p⁸. We also provide guides r, r' and r² for the saw or knife blades and mount them on the frame as indicated in Fig. 1. The first of these devices guides the saw or knife adjacent to the cutting post C, while the others guide it above and below the grinding wheels.

Under working conditions, the shoe G whose inseam is to be trimmed, is so approached to the saw that the portions of the leather or stock to be cut off extend onto the inclined plate c⁶ of the supporting post C and project across the plane of the saw. As the shoe is then moved toward the saw the edge to be removed is held out and temporarily supported by said post so that it is cut through with the greatest ease; the front or turned over edge of the guard plate c' serving as an additional support for the leather or stock while it is being cut. It will be noted that we mount the saw on the pulley wheels B and B' so that its teeth are reversed or pointed up instead of down as is customary in band saws. Owing to this arrangement (which we preferably though not necessarily use) and to the manner in which the saw is sharpened, it acts to shear the material instead of tearing it, and so performs its work in the most satisfactory manner.

As is obvious, the lubricating device may be moved up or down in order to vary the distance between it and the top of the supporting post C; the weight A⁵ serving as a counterbalance for the lubricating block E and its associated parts so as to aid in their adjustment. These parts may be retained in any adjusted position by tightening the set screw a⁶ of the rod a². Similarly the clamping plate c⁴ may be adjusted toward the block E either to compress the absorbent body c² or to accommodate different sized pieces of material and it is to be noted that it also prevents the saw from slipping out of its guides with consequent injury to the operator.

The use of a band saw for the purpose of trimming away the surplus leather or stock as above described is rendered possible largely by reason of the fact that there is provided a supporting structure, in the present instance the post C, of such a shape that there is in front and on both sides of it an unobstructed space through which the shoe may be swung in the manner necessary in trimming. Since said supporting post is relatively narrow and extends on one side of the saw, it does not interfere with this movement of the shoe, although it, with the rod $c$ and the guard $c'$, forms an ample bearing surface for supporting the leather and shoe during the cutting operation.

By the various guards we are enabled to prevent injury to the workmen, since practically the only dangerous portion of the saw exposed is a short length immediately above the material being cut.

We claim:—

1. The combination of a band knife having a supporting frame and operating means, a work supporting post mounted on one side of and adjacent to said cutter, the space in front of the post being unobstructed to permit of the swinging of a shoe in a substantially vertical plane while it is being trimmed, with a work supporting piece mounted immediately adjacent to the cutter but on the side thereof opposite the work supporting post, the top of the piece being at substantially the level of the top of the post.

2. The combination in a band cutter having a supporting frame and operating means, of a work supporting post mounted on the frame and extending immediately adjacent to the cutter, with a guard for said cutter extending downwardly from the top of the post and around that portion of the cutter immediately in front of said post.

3. The combination of a band cutter having a supporting frame and operating mechanism, of a work supporting post mounted on the frame and having one of its faces adjacent to the cutter, with a bar mounted on said post and projecting beyond the face thereof into proximity with the cutter.

4. The combination of a band cutter having a supporting frame and operating mechanism, a work supporting post mounted on the frame and having one of its faces adjacent to the cutter, a bar mounted on said post and projecting beyond the face thereof into proximity with the cutter, and a guard structure mounted on the post and extending around the cutter to cover the portion thereof opposite said bar.

5. The combination of a band cutter having a frame and operating means, a work supporting post mounted adjacent to the cutter, with a guard plate extending around the cutter and having its top edge at substantially the level of the top portion of the post.

6. The combination with a band cutter having a frame and operative means, of a work supporting post having an inclined top, a bar mounted at the upper portion of said post and extending beyond the same into proximity with the cutter.

7. The combination with a band cutter having a frame and operating means, of a work supporting post having an inclined top, a bar mounted at the upper portion of said post and extending beyond the same into proximity with the saw, with a guard for said cutter extending downwardly from said bar.

8. The combination with a band cutter having a frame and operating means, of a work supporting post mounted on one side of the cutter, a guard plate on said post extending around the cutter, with a second plate mounted adjacent to the top of the post so as to also extend around the cutter and provide a support in addition to the top of the post for material operated on.

9. The combination of a band cutter having a frame and operating means, a work supporting post mounted adjacent to a portion of said cutter, and a guard carried by the post to protect a portion of the cutter above the post.

10. The combination of a band knife having a frame and operating means, a work supporting post mounted adjacent to the cutter, with a movable guard protecting a portion of the cutter above said post and loosely resting on the latter.

11. The combination of a band cutter having a frame and operating means, with a work supporting post mounted to extend adjacent to a portion of the cutter, a guard for a part of said cutter above the post, said guard consisting of a vertically movable plate extending around the cutter and guided thereby, with a rod connected to said plate and loosely resting on said post.

12. The combination with a band cutter having a supporting frame and operating means, of a work supporting structure mounted on one side of and immediately adjacent to the cutter, and a guard plate immediately adjacent to the cutter on the side thereof opposite to said structure and arranged with its top portion at substantially the level of the top surface of the supporting structure.

13. The combination with a band cutter having a supporting frame and operating means, of sharpening means for said cutter consisting of two grinding wheels mounted on opposite sides of the cutter, means for driving said wheels from the operating means of the cutter, and independent foot operated devices for moving said wheels into and out of engagement with the cutter at will.

14. The combination with a band cutter having a supporting frame and operating means, of a work supporting post mounted adjacent to the cutter, and a work supporting bar mounted on said post so that its upper edge extends relatively close to the cutter, said bar having its lower portion beveled away from the cutter.

15. The combination with a band cutter having a supporting frame and operating means, of a work supporting post mounted adjacent to the cutter, and a work supporting bar mounted on said post so that its upper edge extends relatively close to the cutter, said bar having its lower front portion beveled away from the cutter, and also having its upper edge beveled from the front to the rear.

In testimony whereof, we have signed our names to this specification, in the presence of two subscribing witnesses.

WILLIAM B. KEIGHLEY.
CHAS. KEIGHLEY.
C. PERCY KEIGHLEY.

Witnesses:
W. S. BROWNE,
A. C. WHITSITT.